United States Patent [19]

Kohara et al.

[11] 4,419,307
[45] Dec. 6, 1983

[54] METHOD FOR MANUFACTURING HEAT-INSULATING MEMBER AND DEVICE THEREFOR

[75] Inventors: Koujirou Kohara; Susumu Miyano, both of Takatsuki, Japan

[73] Assignee: Tokyo Shibaura Denki Kabushiki Kaisha, Kawasaki, Japan

[21] Appl. No.: 363,385

[22] Filed: Mar. 29, 1982

[30] Foreign Application Priority Data

Apr. 1, 1981 [JP] Japan .................................. 56-48919

[51] Int. Cl.³ .............................................. B29D 27/04
[52] U.S. Cl. ..................................... 264/46.5; 249/79; 249/80; 264/46.4; 264/46.7; 264/225; 264/337; 264/DIG. 83; 425/DIG. 29
[58] Field of Search ........................ 264/46.5, 337, 225, 264/48, 46.6, DIG. 83, 46.7; 425/DIG. 29; 249/79, 80

[56] References Cited

U.S. PATENT DOCUMENTS

| | | | |
|---|---|---|---|
| 2,632,922 | 3/1953 | Kish | 425/DIG. 29 |
| 2,969,544 | 1/1961 | Di Marco et al. | 425/DIG. 29 |
| 2,976,577 | 3/1961 | Gould | 264/46.5 X |
| 3,000,058 | 9/1961 | Thielen, Jr. | 264/46.5 |
| 3,007,203 | 11/1961 | Ammons | 264/48 |
| 3,055,058 | 9/1962 | van Hartesveldt | 264/337 X |
| 3,137,744 | 6/1964 | Burrus | 264/46.5 |
| 3,155,751 | 11/1964 | Morris | 264/46.5 |
| 3,289,253 | 12/1966 | Buonaivto | 425/DIG. 29 |
| 3,325,861 | 6/1967 | Pincus et al. | 425/DIG. 29 |
| 3,723,584 | 3/1973 | Nussbaum | 249/80 X |
| 3,723,585 | 3/1973 | Nussbaum | 264/337 X |
| 3,733,161 | 5/1973 | Nussbaum | 249/80 X |
| 3,773,879 | 11/1973 | Munsil et al. | 264/225 X |
| 4,093,173 | 6/1978 | Kawamata et al. | 264/337 X |
| 4,167,430 | 9/1979 | Arachi | 264/337 X |
| 4,298,324 | 11/1981 | Soulier | 264/337 X |

FOREIGN PATENT DOCUMENTS

654162 12/1962 Canada ....................... 425/DIG. 29

OTHER PUBLICATIONS

Ferrigno, T. H. "Rigid Plastics Foams" New York, Reinhold, ©1963, pp. 42–46.
37 CFR: Patents, Trademarks and Copyrights, revised Jul. 1, 1978, p. 103.

*Primary Examiner*—Philip E. Anderson
*Attorney, Agent, or Firm*—Cushman, Darby & Cushman

[57] ABSTRACT

A method for manufacturing a heat-insulating member, such as e.g. a door or housing of a refrigerator, including a shell and a foamed heat-insulating material filled in the shell and a jig used therefor. The jig is intended to hold the shell lest the shell of the heat-insulating member to be manufactured should be deformed when a foamable liquid composition is foamed in the shell. In the jig of this invention, a jig body is formed of a heat-insulating material. The method of this invention comprises the steps of holding the shell in a hollow state by means of two jigs, injecting the foamable liquid composition into the shell to foam the same in the shell. Since the jig body of the jig of this invention is made of a heat-insulating material, the necessity of external heating, which is essential to the conventional method, is substantially obviated.

9 Claims, 7 Drawing Figures

METHOD FOR MANUFACTURING HEAT-INSULATING MEMBER AND DEVICE THEREFOR

BACKGROUND OF THE INVENTION

I. Field of the Invention

This invention relates to a method for manufacturing a heat-insulating member having a shell and a device therefor, more specifically to a method for manufacturing a heat-insulating member having a shell used for the housing or door of a refrigerator and other applications, including steps of injecting a foamable liquid composition into the shell of the heat-insulating member and foaming the composition in the shell, and a jig for holding the shell when the composition is foamed in the shell.

II. Description of the Prior Art

Presently, most of housing and doors of refrigerators, for example, are those that a foamed heat-insulating material, such as e.g. foamed polyurethane, is filled in a thin shell. Filled with the heat-insulating material, these refrigerator housing and doors are improved in heat insulating property, and can hence serve as heat-insulating members as well as their original functions.

Those heat-insulating members are conventionally manufactured by the following method. First, a hollow shell, which is not filled with any material yet, is placed in a lower jig made of metal, and is then pressed down by an upper jig also made of metal. These jigs are intended to hold the shell to prevent it from being deformed when the foamable liquid composition is later foamed in the shell. The shell is provided with an aperture through which the foamable liquid composition is to be injected into it afterward. Also, the upper jig is provided with an injection hole to open into the aperture of the shell, whereby the liquid composition will be injected.

Subsequently, the shell thus held in the jigs are heated in a furnace along with the jigs (preheating). Then, the shell, as well as the jigs, is removed from the furnace, and the foamable liquid composition is injected into the shell through the holes formed in the upper jig and the shell. Since the foamable liquid composition is prepared by mixing resin components with a foaming agent directly before the injection, the foaming of the resin components occurs substantially in the shell. The purpose of the aforesaid preheating is to accelerate the foaming reaction to assure the sufficient expansion of the heat-insulating material. If the preheating is eliminated, then the heat of the foaming material will be absorbed by the metal jigs and the shell, so that the material will solidify before it sufficiently expands. The preheating is necessary to avoid this.

Finally, to complete the foaming process, the heat-insulating member is heated again together with the jigs in the furnace (postheating), and then removed from the furnace, and the completed heat-insulating member is taken out of the jigs.

Including the steps of preheating and postheating, the prior art manufacturing process requires the furnace and fuel therefor. As a result, the price of the manufactured heat-insulating member will be increased. Made of metal, moreover, the jig is quite heavy (normally weighing about 300 kg) and hard to handle. Therefore, the material cost and manufacturing cost of the jig, as well as other associated expenses, will pile up to increase the price of product.

SUMMARY OF THE INVENTION

Accordingly, an object of this invention is to provide a method for manufacturing a heat-insulating member having a shell, capable of substantially obviating both preheating and postheating, and hence of reducing manufacturing cost.

Another object of the invention is to provide a jig used for effecting the aforesaid manufacturing method.

Still another object of the invention is to provide a jig reduced in weight and hence capable of saving material cost, manufacturing cost, and other associated expenses.

According to this invention, there is provided a method for manufacturing a heat-insulating member including a shell and a foamed heat-insulating material filled in the shell, which comprises the steps of providing first and second jigs each having a jig body formed of a heat-insulating material, laying the shell, which is not filled with the heat-insulating material yet and is hollow, on the jig body of the first jig, putting the second jig on the shell, thereby restraining the shell from being deformed when an foamable liquid composition is foamed in the shell in the step to follow, injecting the foamable liquid composition into the shell to foam the composition therein, and removing the resultant heat-insulating member from the first and second jigs.

According to this invention, moreover, there is provided a jig used for manufacturing the aforesaid heat-insulating member, which comprises a jig body for holding the shell to prevent the same from being deformed when the foamable liquid composition is foamed in the shell, the jig body having its inside contour substantially complementary to the outside shape of the shell and being formed substantially of a heat-insulating material.

DETAILED DESCRIPTION OF THE PREFERRED EMBODIMENTS

In general, the forming reaction of a foaming agent is an exothermic reaction. The inventors hereof deliberated over the way of eliminating the steps of preheating and postheating, which is required by the prior art method, by utilizing the heat of reaction. Then, it was found that the heat of reaction may effectively be utilized by forming the jig for holding the shell with a heat-insulating material. This means that the steps of preheating and postheating, which are essential to the prior art process, may substantially be omitted. This invention is based on this very discovery. Such state of things may be understood as follows. In the prior art process, most of the heat of reaction is absorbed by the jig which is made of metal, so that, without the preheating, the injected foamable liquid composition would solidify before it sufficiently expands in the shell, and that, without the postheating, the foaming reaction would not advance satisfactorily. On the other hand, the jig of this invention, at least its main body, is formed of a heat-insulating material. Accordingly, the heat inside the shell is prevented from going out of the shell, so that the injected liquid composition never solidifies before it sufficiently expands in the shell, and the temperature inside the shell and the speed of foaming reaction are both increased. Most probably, this is the reason why the external heating is substantially unnecessary.

Figure 1:
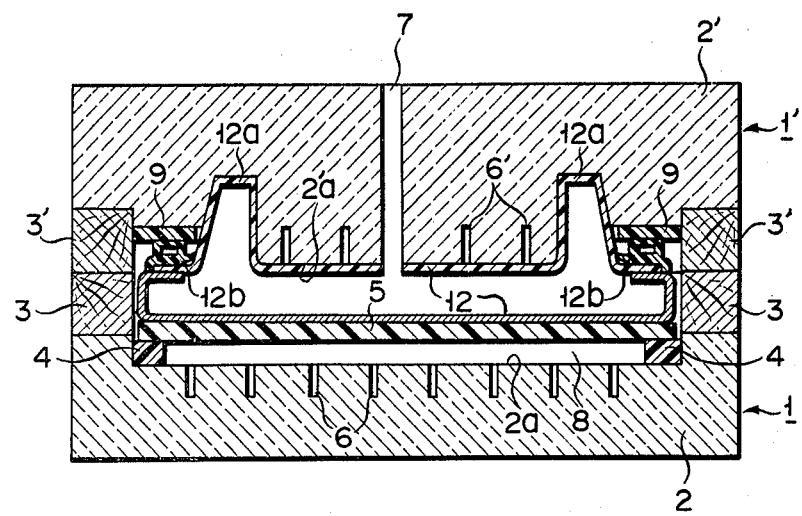
FIG. 1 is a sectional view showing a jig according to an embodiment of this invention and a refrigerator door held thereby.

There will now be described in detail the preferred embodiments of this invention with reference to the accompanying drawings. FIG. 1 is a sectional view of a jig according to an embodiment of this invention. The jig of this embodiment is intended to hold a shell 12 of a door of a refrigerator when a foamable liquid composition injected into the shell 12 is foamed in it, to prevent deformation of the shell 12 of the door. In FIG. 1, the shell 12 is held in a lower jig 1, and an upper jig 1' is laid on the shell 12 to hold the same. The lower and upper jigs 1 and 1' are essentially the same in structure, and those portions of the upper jig 1' corresponding the portions of the lower jig 1 are designated by the same numerals used for lower jig 1 but with primes. The lower jig 1 is formed of a thick, rectangular jig body 2 and a reinforcing frame 3 arranged on the periphery of the jig body 2. The jig body 2 is formed of a heat-insulating material, such as e.g. foamed polyurethane. The reinforcing frame 3, whose structure will later be described in detail, is intended for effective prevention of warp, torsion, breakage, etc., of the jig body 2. A shallow, wide cavity 8 is formed in the top of the jig body 2, and a plurality of thin grooves 6 are formed in the surface 2a of the jig body 2. Normally, the width of the thin grooves 6 is 2 mm or less, and their depth, as well as the intervals between them, ranges from approximately 10 mm to 50 mm. These thin grooves 6 prevent the deformation, such as warp, of the jig body 2 attributable to residual stress remaining after the molding of the jig body 2, constituting a way of escape for gas produced during the molding. A receiving frame 4 with a thickness of approximately 3 mm to 6 mm is mounted on the peripheral edge portion of the cavity 8, and a receiving plate 5 formed of a hard thin plate, such as Bakelite plate, is placed on the receiving frame 4. Thus, a gap corresponding to the thickness of the receiving frame 4 is defined between the receiving plate 5 and the top surface 2a of the jig body 2. The receiving plate 5 is arranged in this manner lest the top surface 2a, which may be roughed in the molding of the jig body 2, should come into contact with the heat-insulating member, such as the refrigerator door, to deform the same. Moreover, the receiving plate 5 is isolated from the top surface 2a by the gap so that it may enjoy natural flexure.

In pressing down the heat-insulating member (refrigerator door in this embodiment) by using the jigs, the refrigerator door is laid on the receiving plate 5, and the upper jig 1' is put on the door. The basic structure of the upper jig 1' is substantially the same as that of the lower jig 1. Of course, however, a jig body 2' of the upper jig 1' has an inner surface of the shape corresponding to the shape of the door. A surface 2'a of the jig body 2' is directly in contact with the refrigerator door. Only the gasket portion of the door, however, is isolated from the surface 2'a of the jig body 2' by means of a gland 9 formed of a thin hard plate, such as a Bakelite plate. In the upper jig 1', unlike the lower jig 1, there is no gap between the gland 9 and the surface 2'a. Further, the jig body 2' is provided with an injection hole 7 for injecting an foamable liquid composition. The injection hole 7 opens into an aperture bored in the shell of the refrigerator door.

Figure 2:
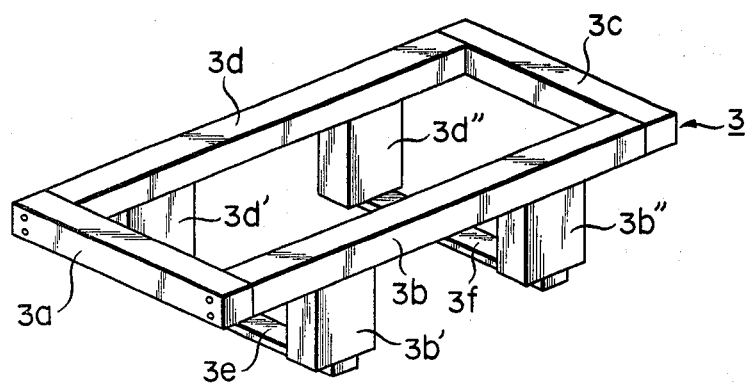
FIG. 2 is a perspective view extractively showing a reinforcing frame of the jig shown in FIG. 1.

Referring now to FIG. 2, there will be described the structure of the reinforcing frame 3 of the lower jig 1. The reinforcing frame 3 is composed of six frame members 3a, 3b, 3c, 3d, 3e and 3f. The frame members 3b and 3d are provided with a pair of legs 3b' and 3b" and another pair of legs 3d' and 3d", respectively. The two end portions of the frame member 3a are fixed to one end faces of the frame members 3b and 3d, severally, while those of the frame member 3c are fixed to the other end faces of the frame members 3b and 3d, severally. Further, the end portions of the frame member 3e are fixed to the legs 3b' and 3d', while those of the frame member 3f are fixed to the legs 3b" and 3d". All these frame members 3a to 3f are made of wood, Bakelite, or metal.

Figure 3:
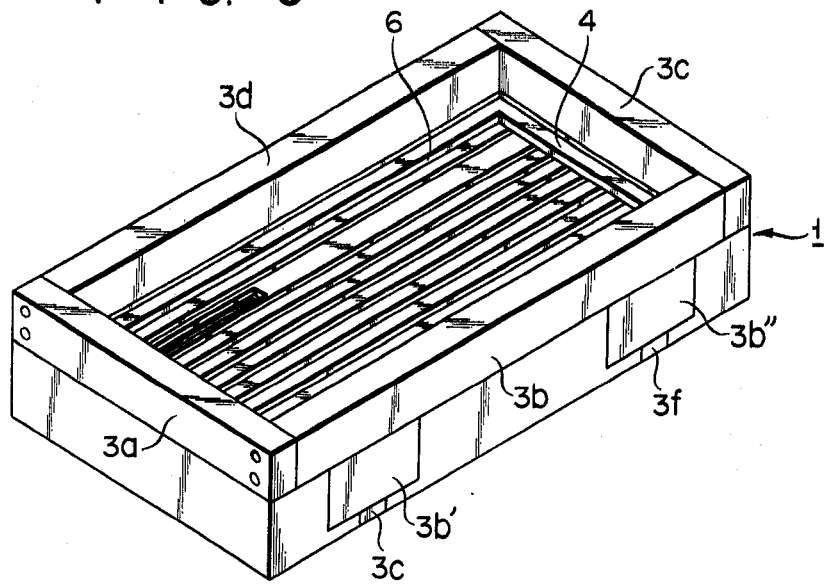
FIG. 3 is a perspective view of the jig shown in FIG. 1.
Figure 4:
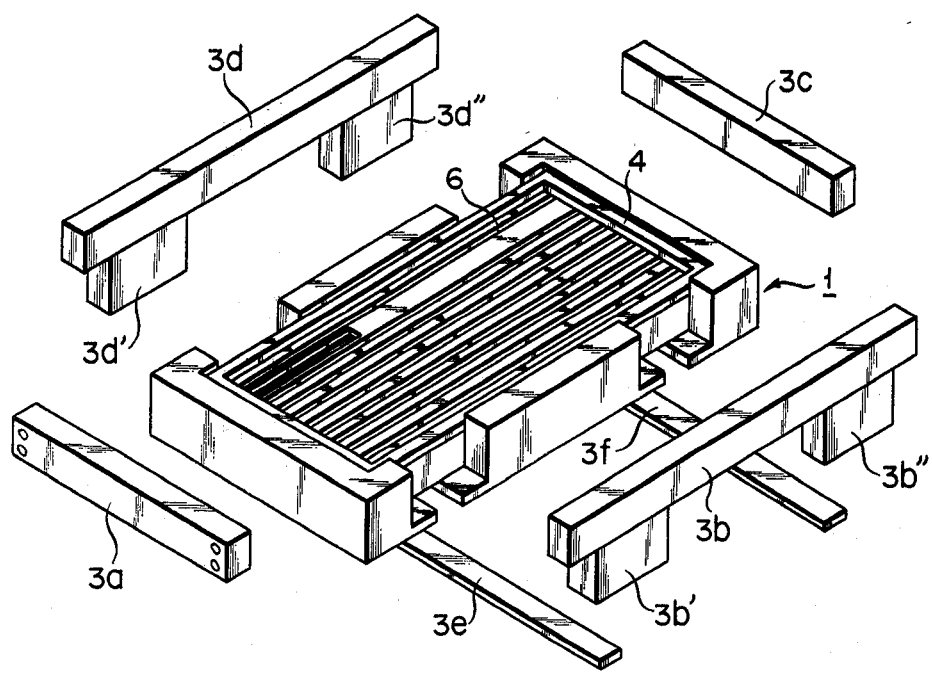
FIG. 4 is a perspective view showing the reinforcing frame of the jig of FIG. 3 as it is removed from the jig body.

The lower jig 1 is made in the following manner. First, the reinforcing frame 3 is assembled as shown in FIG. 2. The frame members are fixed to one another by means of an adhesive agent or nails. Then, the assembled reinforcing frame 3 is put into a mold for making the lower jig 1. The mold has a rectangular inner wall, and is just large enough to hold the reinforcing frame 3. After the reinforcing frame 3 is put into the mold, an intermediate jig in the shape of the refrigerator door is fixed in the mold, and an foamable liquid composition to form the body 2 of the lower jig 1 is poured into the mold and solidified therein. As a result, the lower jig 1 as shown in FIG. 3 is obtained. If a mold releasing agent such as silicone is previously applied to the frame members 3a to 3f, these frame members will be able to be separated from the jig body 2 for reuse, as shown in FIG. 4, even in case the jig bocy 2 is broken by any shock.

Figure 5:
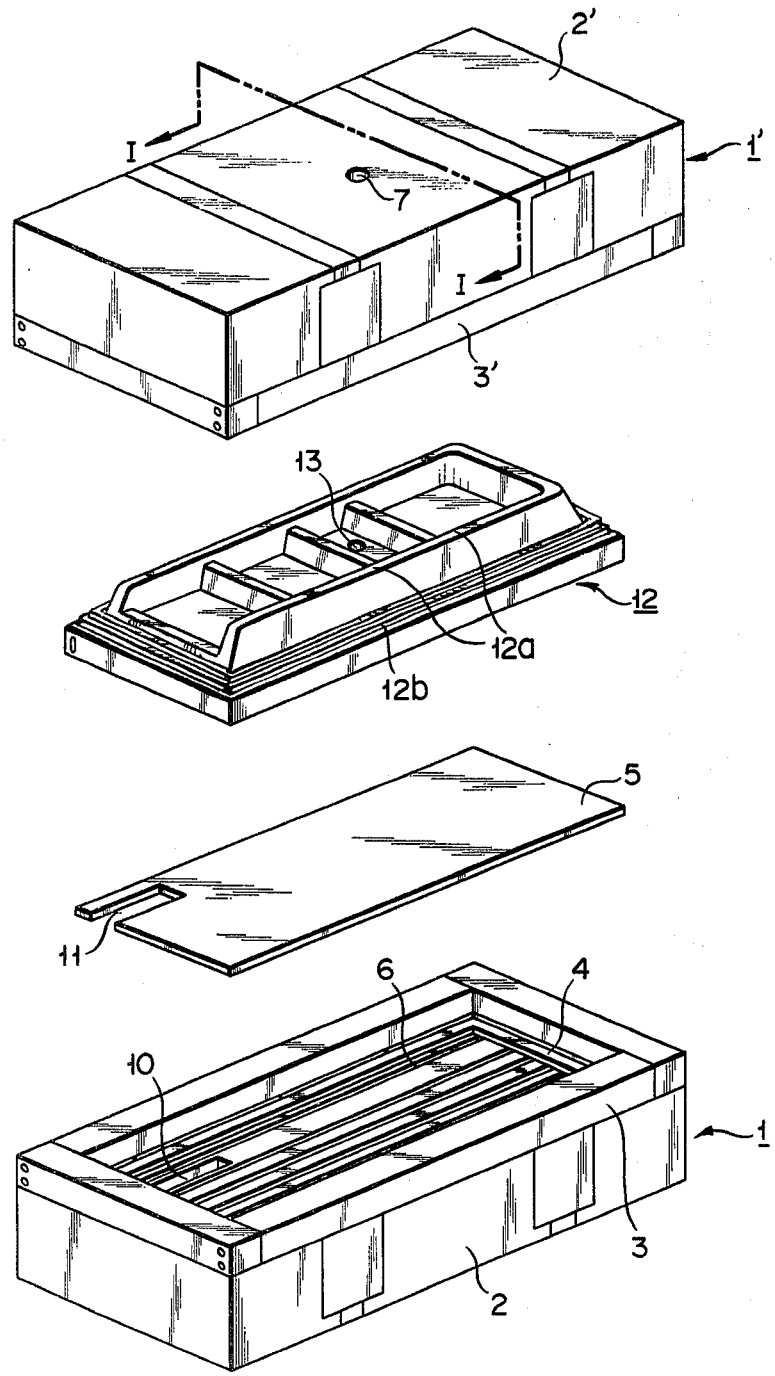
FIG. 5 is an exploded perspective view for illustrating the way the jig of the invention holds the refrigerator door.

Referring now to FIG. 5, there will be described a method for manufacturing the refrigerator door by the use of the jig of this invention. First, the aforesaid lower jig 1 is prepared. A slit 10 in the jig surface 2a is a handle relief opening to receive a handle or doorknob (not shown) of the refrigerator door 12. The receiving plate 5 is mounted on the receiving frame 4 of the lower jig 1. The receiving plate 5 also is provided with a handle relief opening 11. Then, the refrigerator door 12 is laid on the receiving plate 5. The door 12 is a hollow shell which is composed of an outer portion make of steel and an inner portion made of plastics such as ABS resin, HIS resin, or polyvinyl chloride. Formed in the vicinity of the center of the door 12 is an aperture 13 through which the foamable liquid composition is to be injected later. The door 12 is laid on the receiving plate 5 with its outer face downward so that its handle is fitted in the handle relief openings 10 and 11. Finally, the upper jig 1' is put on the door 12.

Figure 6:
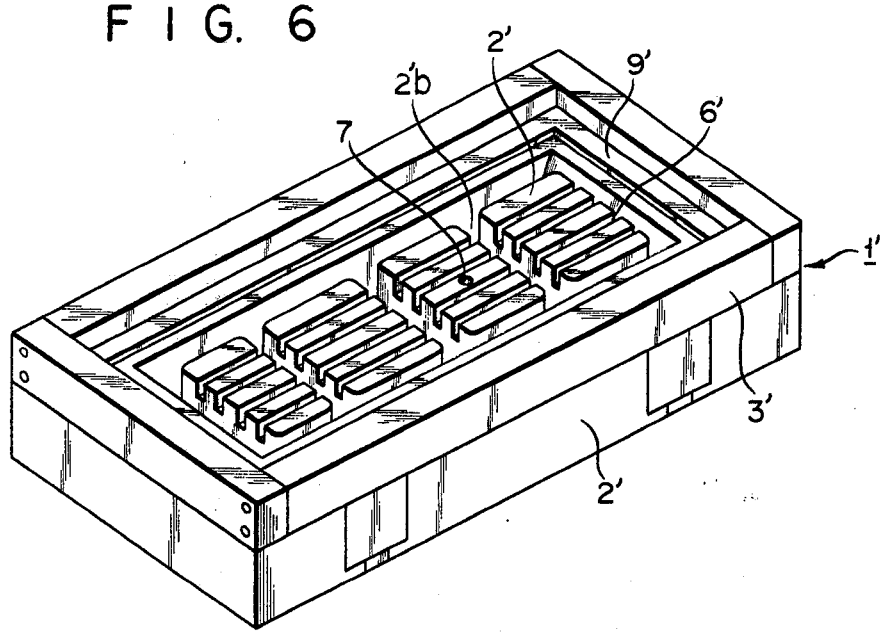
FIG. 6 is a perspective view of an upper jig shown in FIG. 5 as it is turned over.

FIG. 6 is a perspective view of the upper jig 1' as it is turned over. Naturally, the body 2' of the upper jig 1' has a shape just to fit the contour of the door 12. Namely, the jig body 2' is provided with a recessed portion 2′b corresponding to a projected portion 12a of the door 12. When the upper jig 1′ is put on the door 12, the projected portion 12a is fitted in the recessed portion 2′b, and the door 12 is fully pressed and held between the lower and upper jigs 1 and 1′. The gland 9 (see FIG. 1) should be set on the gasket portion 12b of the door 12 before the upper jig 1′ is put on the door 12. Thus, FIG. 1 is given as a sectional view of a combination of the lower jig 1, receiving plate 5, door 12, and upper jig 1′ as taken along line I—I of FIG. 5.

In the next stage, the foamable liquid composition is injected into the hollow space in the door 12. In doing this, a foamable liquid composition i.e., liquefied resin components, and the foaming agent is injected through the injection hole 7 in the upper jig 1′. The foamable liquid composition to be injected may be any composition which has conventionally been used in the field. For example, polyol and diisocyanate for making polyurethane may be used for the resin components, and trichloromonofluoromethane $CCl_3F$ gas (fluorocarbon R-11) may be given as the foaming agent. The liquefied resin components and foaming agent are mixed directly before the injection. Accordingly, the foaming reaction occurs substantially wholly in the shell.

Having the jig body made of a heat-insulating material, the jig of this invention hardly absorbs heat produced by the foaming reaction. Even if the door 12 is not preheated, therefore, the injected foamable liquid composition can enjoy satisfactory foaming reaction due to heat insulation effect. Further, the foaming reaction is accelerated, and thus a foamed heat-insulating material with a satisfactory foaming degree may be obtained without any external heating. Accordingly, the step of postheating, which is required in the prior art process, becomes unnecessary. Although the foaming reaction takes place in the shell, the shell which is held by the upper and lower jigs, will never be deformed.

After the foaming reaction is ended, the upper jig 1′ is removed, and then the door 12 filled with the foamed heat-insulating material is taken out. The foamed heat-insulating material filled in the door 12 is exposed through the aperture 13 of the door 12. Thereupon, the aperture 13 is covered with a small plate bearing thereon the standards or specifications for the refrigerator. Thus, the door 12 is completed.

As in the above-mentioned embodiment, the whole of the jig body 2 should preferably be made of a heat-insulating material. Like the reinforcing frame 3, however, part of the jig body 2, e.g. the peripheral portion thereof, may also be made of Bakelite, wood or metal. In other words, it is necessary only that the jig body be formed substantially of a heat-insulating material.

In the above-mentioned embodiment, the reinforcing frame 3 is provided for effectively preventing warp, torsion, breakage, etc., of the jig body 2. The reinforcing frame 3 is not, however, essential to the jig of the invention. In FIG. 1, the lateral of the shell of the heat-insulating member looks like being deformed without the reinforcing frame 3 because of the absence of the lateral pressure thereon. If the thickness of the heat-insulating member is small as in the case of the above embodiment, however, the lateral strength of the shell is so great that the lateral of the shell will never be deformed even without the lateral pressure.

Figure 7:
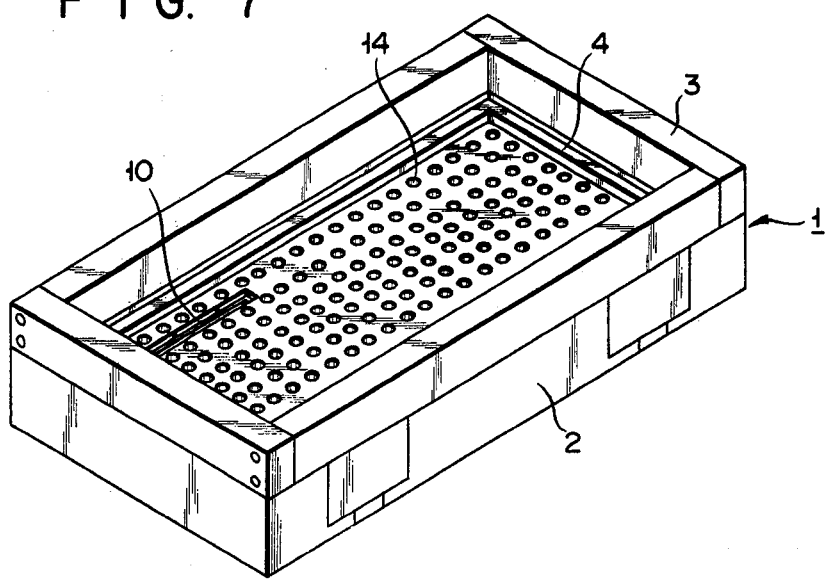
FIG. 7 is a perspective view of a jig according to an alternative embodiment of the invention.

Further, the thin grooves 6, receiving frame 4, and receiving plate 5, which have their respective functions as aforesaid, are not essential, either. Furthermore, the thin grooves 6 may be replaced with a plurality of fine perforations 14, as shown in FIG. 7, without deteriorating the effect of the invention.

According to this invention, as described in detail herein, both the preheating and postheating, which is essential to the prior art method, may substantially be obviated. In winter when the air temperature is low, some preliminary heating should be required. In this case, it is necessary only that the receiving plate 5 be used and heated solely. Accordingly, the cost of heating may be reduced or eliminated, and the necessity of a furnace may be obviated. Weighing about one-fifth (approx. 60 kg) as heavy as the conventional metal jig, the jig of this invention is easy to handle, ensuring a reduction in cost of associated devices. Moreover, the material cost and manufacturing cost of the jig are also reduced, so that the price of the resultant heat-insulating member may be held down.

What we claim is:

1. A method for manufacturing a heat-insulating member including a shell filled with a foamed heat-insulating material, which comprises the steps of:
   providing first and second jigs, each including a jig body substantially formed of a heat-insulating material and having its inside contour substantially complementary to the outside shape of said shell, and a reinforcing frame arranged at the periphery of said jig body for reinforcing said jig body;
   laying said shell which has not yet been filled with the heat-insulating material and is hollow, on the jig body of said first jig;
   putting said second jig on said shell, thereby preventing said shell from being deformed when a foamable liquid composition is foamed within said shell in the step to follow;
   injecting the foamable liquid composition into said shell to foam said composition therein; and,
   removing a resultant heat-insulating member from said first and second jigs.

2. The method according to claim 1, wherein said shell is laid on said jig body through a thin receiving plate.

3. The method according to claim 2, wherein said receiving plate is mounted on a receiving frame formed at the peripheral edge portion of said jig body, so that a gap is defined between the inner surface of said jig body and said receiving plate.

4. The method according to any one of claims 1 to 3, wherein a plurality of thin grooves are formed in the inner surface of said jig body.

5. The method according to any one of claims 1 to 3, wherein a plurality of fine perforations are formed in the inner surface of said jig body.

6. A jig used for manufacturing a heat-insulating member including a shell filled with a foamed heat-insulating material, which comprises:
   a jig body for holding said shell to prevent the same from being deformed when a foamable liquid composition which is to become said foamed heat-insulating material is foamed within said shell, said jig body having its inside contour substantially complementary to the outside shape of said shell and being formed substantially of a rigid type foamed heat-insulating material; and
   a reinforcing frame arranged at the periphery of said jig body for reinforcing said jig body.

7. The jig according to claim 6, wherein said rigid type foam heat-insulating material is foamed polyurethane.

8. The jig according to claim 6 or 7, wherein a plurality of thin grooves are formed in the inner surface of said jig body.

9. The jig according to claim 6 or 7, wherein a plurality of fine perforations are formed in the inner surface of said jig body.

* * * * *